United States Patent [19]
Goodwin et al.

[11] 3,808,393
[45] Apr. 30, 1974

[54] STRIP LINE FLASH WELDING MACHINES

[75] Inventors: Austin Gerald Goodwin; John Colin Clews, both of Dudley, England

[73] Assignee: British Federal Welder & Machine Company Limited, Dudley, England

[22] Filed: Dec. 17, 1971

[21] Appl. No.: 209,274

[30] Foreign Application Priority Data
Dec. 19, 1970 Great Britain.................. 60398/70
Jan. 22, 1971 Great Britain..................... 2922/71

[52] U.S. Cl..................... 219/97, 219/101, 219/105
[51] Int. Cl.............................................. B23k 9/00
[58] Field of Search............ 219/101, 104, 105, 97, 219/100; 29/488

[56] References Cited
UNITED STATES PATENTS

| | | | |
|---|---|---|---|
| 2,328,784 | 9/1943 | Gates et al. | 219/97 |
| 3,106,013 | 10/1963 | Rozmys | 29/488 X |
| 3,397,300 | 8/1968 | Schonmann | 219/101 |
| 3,093,018 | 6/1963 | Rozmus | 29/488 X |
| 3,335,257 | 8/1967 | Sakharnov et al. | 219/101 |
| 2,995,239 | 8/1961 | Fugassi, Jr. | 219/105 X |
| 3,613,107 | 10/1971 | Cavagnero | 219/105 |

*Primary Examiner*—C. L. Albritton
*Attorney, Agent, or Firm*—Flynn & Frishauf

[57] ABSTRACT

A method of and a welding machine for joining ends of metal strips. The machine has clamps for holding the strip ends in a die gap, and apparatus for cleaning and shearing the strip ends, readjusting the strip ends in the clamps and automatically abutting the sheared ends for flash welding and subsequently forcing together the heated strip ends.

9 Claims, 9 Drawing Figures

STRIP LINE FLASH WELDING MACHINES

Prior Application: Priority, Great Britain Dec. 19, 1970 Application No. 60398/70 and Jan. 22, 1971 Application No. 2922/71

This invention relates to strip line flash welding machines.

Strip line flash welding machines are used to connect together metal strips that are then supplied as a continuous metal strip for further processing and manufacture. The welding operation must be carried out quickly and must provide welds of a uniformly high standard. The normal preparation for the welding of strip includes shearing the ends of the old and new strips in a line away from the welding machine and abutting these surfaces against a gauge bar. The alignment of the strip ends with the gauge bar is critical for satisfactory welding results and is under the control of the operator thus leading to lack of consistency between successive welds.

It is an object of the present invention to improve and simplify the welding operation.

It is a further object of the present invention to dispense with the use of a gauge bar.

The present invention is a method of welding strips in a strip line flash welder including locating the ends of metal strips in a shear position, passing cutting elements horizontally through the shear position, and moving the clamps and thereby the strip ends relative to each other in readiness for welding.

The present invention is further a strip line flash welder including clamps for securing the ends of metal strips, a shear unit for shearing the ends of the metal strips between the clamps, and means for moving the clamps, and thereby the strip ends, relative to each other in readiness for welding.

Provision may be made for movement of the shearing elements out of alignment with the weld dies.

The strip ends may be clamped for shearing between main and auxiliary clamps.

Preferably the auxiliary clamps for each strip end are movable along the strip flow path relative to the main clamps.

Embodiments of the present invention will now be described, by way of example, with reference to the accompanying drawings, in which:

FIGS. 1a to 1e form a chart illustrating a sequence of events in preparing for welding;

Figure 1A:
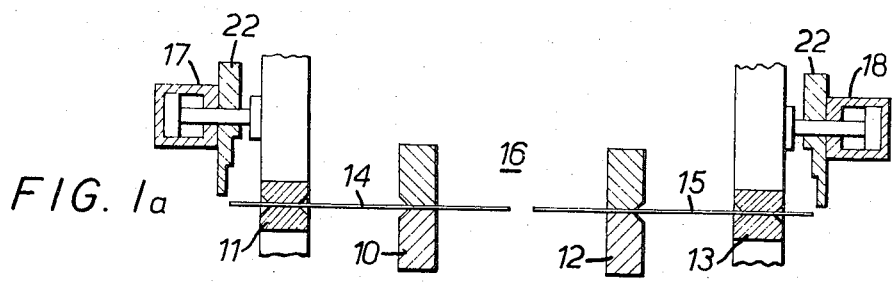
FIG. 1f illustrates a modification of the sequence of FIGS. 1a to 1e.

Referring now to the drawings, FIGS. 1a to 1e, illustrate the stages in preparing for welding on a strip line flash welding machine according to the present invention. The welder is provided with main and auxiliary clamps 10 and 11 for the trailing edge of the old metal strip 14 and main and auxiliary clamps 12 and 13 for the leading edge of the new strip 15. Between the main clamps 10 and 12 is defined a clamp or shear position 16 and associated with the auxiliary clamps 11 and 13 are hydraulic units 17 and 18 respectively for moving the auxiliary clamps relative to the main clamps. For the sake of clarity the units 17 and 18 are shown only in FIG. 1a.

In FIG. 1a all the clamps are shown closed, the ends of the strips being located in the position 16 which in this embodiment is about nine inches long, i.e. the space between the main clamps 10 and 12 is about nine inches. The operator need only ensure that the ends each project at least about one inch into the position 16 to ensure shearing but this is an easy operation and requires little skill on the part of the operator.

Figure 1B:
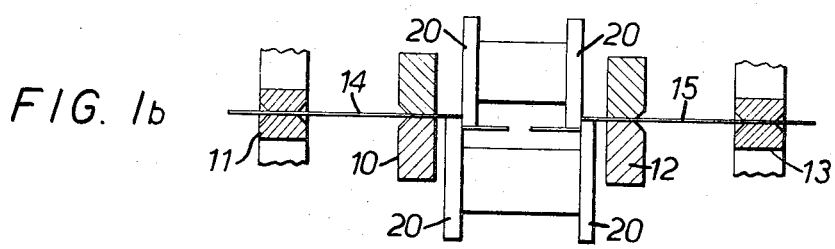
Figure 1C:
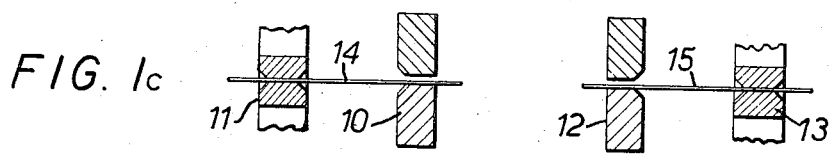

A shearing unit is then activated, as seen in FIG. 1b, to pass the cutting elements 20 through the position 16. As will be described hereinafter the elements 20 pass horizontally through the position 16 rather than vertically as is customary.

The main clamps 10 and 12 are then opened (FIG. 1c) and the units 17 and 18 are actuated to move the auxiliary clamps 11 and 13 relative to the main clamps so that the strip ends project a specified amount beyond the main clamps. This control is achieved by stops 22 which are provided with three positions and which limit piston travel in the units 17 and 18. In this way the projection of the strips from the clamps is accurately controlled to one of three values provided by the stops 22.

Figure 1D:
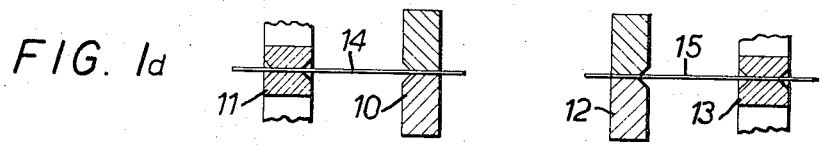
Figure 1E:
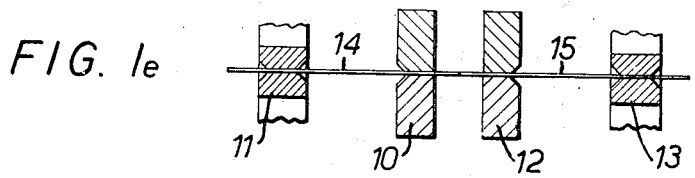
Figure 4:
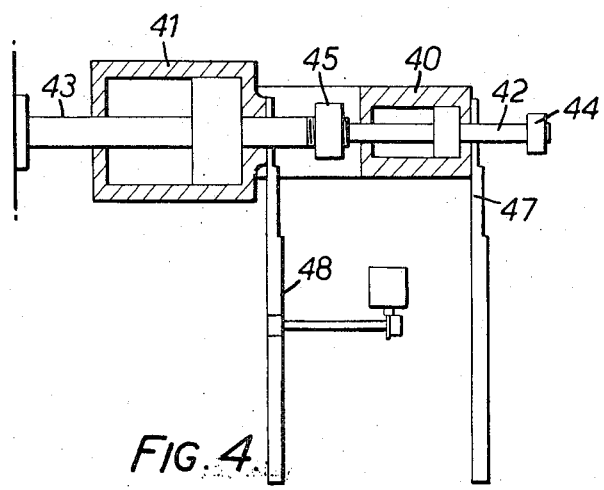
FIG. 4 is a diagrammatic view of a piston arrangement for moving a platen in a line flash welding machine according to the present invention.

In FIG. 1d the main clamps are shown as closed again and in FIG. 1e the customary movement of the leading edge of the new strip 15 to abut the trailing edge of the old strip 14 to prepare for or commence the flash welding is shown. This movement is achieved by movement of a platen (not illustrated), mounting the main and auxiliary clamps 12 and 13, by means of the piston arrangement of FIG. 4.

In this way accurate shearing and positioning relative to the main clamps 10 and 12 of the strip ends enables gauge bars to be dispensed with and allows the production of welds of consistently good quality.

Figure 2:
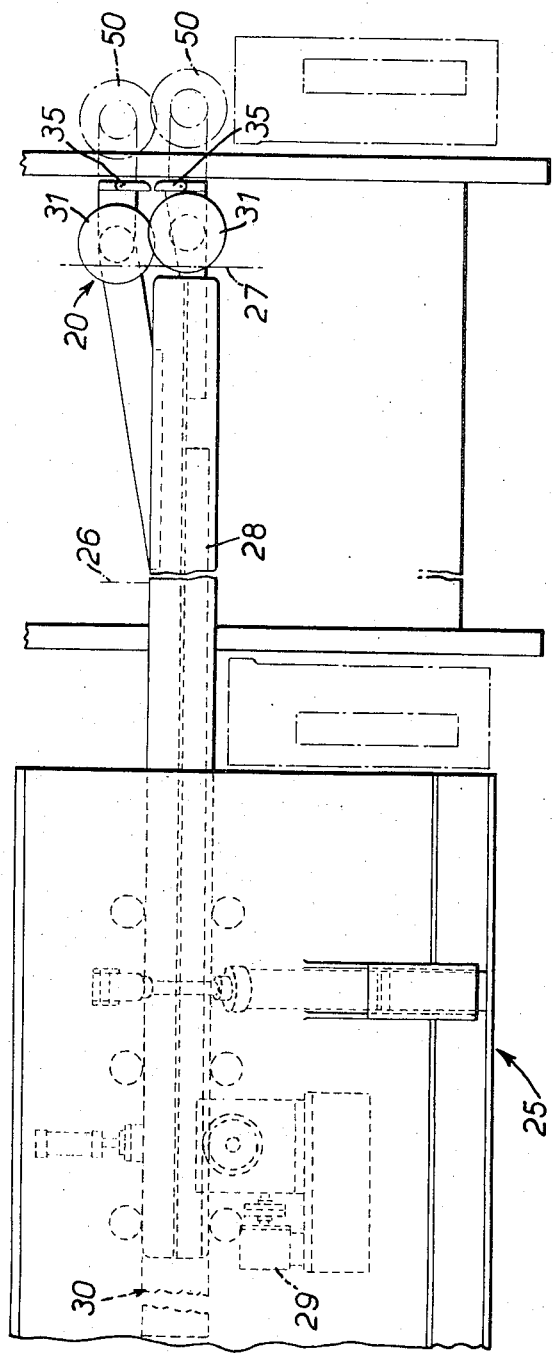
FIG. 2 is a side elevation of a shear unit according to this invention.
Figure 3:
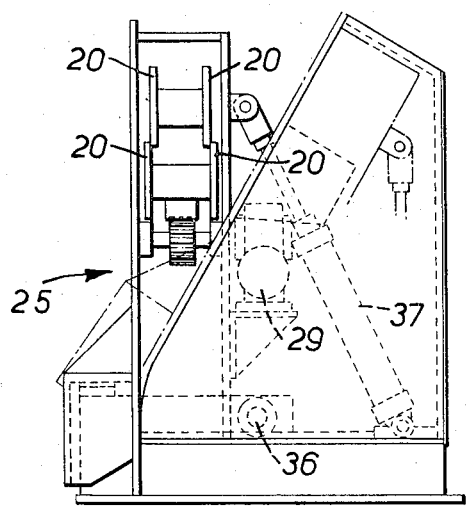
FIG. 3 is an end elevation of the unit of FIG. 2.

The accurate shearing is by means of the shearing unit 25 illustrated in FIGS. 2 and 3. The unit 25 is mounted to the side of the flow path of strip through the whole flash welder, i.e., in FIG. 2 the edges of the flow path are shown at 26 and 27.

The unit 25 consist of a beam 28 which is reciprocable by means of a motor 29 from a retracted position, indicated at 30 in FIG. 2, to the fully extended position shown in FIG. 2. At its end the beam 28 mounts the cutting elements 20, in this embodiment two pairs of shearing cutter wheels only one of which, 31 is shown in FIG. 2. One pair of wheels is of course for the old sheet 14 and the other pair for the new sheet 15. The upper and lower cutter wheels of each pair are displaced as shown to avoid deformation of the strip edges during shearing.

Also provided on the end of the beam 28, to preceed the cutter wheels during shearing, are scrapers 35 for scraping any welding spatter from the faces of the main clamps 10 and 12. An air blast is provided to remove any such spatter that may fall onto the top of the strips.

To avoid any deposit of spatter on the unit 25 itself, the unit, as shown in FIG. 3, is mounted on a pivot 36 so that in the retracted position 30 of the beam, the whole unit may be pivoted by means of hydraulic rams out of alignment with the shearing position 16 in which the welding operation also takes place.

In the welding operation, the platen mounting the main and auxiliary clamps 12 and 13 moves twice, firstly to abut the ends of the strips (FIG. 1e) to commence flash and secondly to upset, i.e., to force together and fuse the heated ends of the strip. These movements, in this embodiment, are accurately controlled by the piston arrangement of FIG. 4, consisting of two hydraulic piston/cylinder units 40 and 41. Associated with the units 40 and 41 are piston rods 42 and 43 respectively. The rod 42 carries a stop 44 at its rear end and at its forward end abuts a stop 45 at the rear end of the rod 43. The front end of the rod 43 engages the platen. The stops 44 and 45 respectively cooperate with stop members 47 and 48, which again have three possible positions, corresponding to the three positions of the stops 22. In use, the unit 40 is first connected to the hydraulic supply and movement of its piston advances the rod 42 which pushes the rod 43 and thus the platen until the stop 44 engages the member 47. At this point the edges of the metal strips are abutting for the commencement of welding. Subsequently, for the upset movement of the platen, the unit 41 is connected to the hydraulic supply and a further advance of the platen results until the stop 45 engages the member 48. Thus the relationships between the various stop members 22, 47 and 48 and their respective hydraulic units is such that, after shearing, the movements of the strip ends are automatically controlled to position the ends correctly for the next operation.

The three positions of the stop members correspond to three ranges of thickness of strip, for example:
0.050 to 0.100 inches
0.100 to 0.150 inches
0.150 to 0.200 inches, and
the positions of the stop members are under the control of a common selector switch.

Modifications may be made to the embodiments described. The cutting elements may comprise rotary upper blades and stationary lower blades, or vice versa. Alternatively a guillotine shear may be employed. Also magnets may be provided to remove the scrap cutoffs from the machine.

Figure 1F:
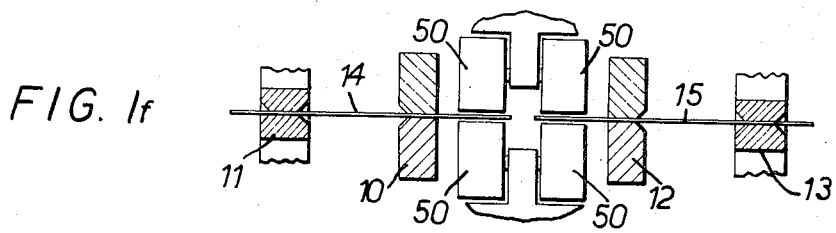

An important modification of the embodiment described so far, is illustrated in FIGS. 1f and 2. The inclusion of flash welding facilities for coil joining operations in continuous pickle lines involves the siting of the flash welder at the entry section of the line, with the strip being joined prior to its transfer through the continuous pickling system.

At the point where the weld is made therefore, surface scale is still present on the strip.

This scale, being more resistive than steel, tends to impede the passage of current into the strip during the welding operation, and in addition, causes high temperatures to be reached on the surface of the material which leads to pitting and erosion of the die surfaces of the machine.

The thickness and adhesion of the scale is not controlled and the presence of this scale therefore introduces a variable into the welding operation and causes difficulty in the production of consistent high quality welds.

This problem can be obviated or mitigated by mounting at the end of the beam 28 of the shearing unit, i.e., in advance of the scrapers 35, means for cleaning the strip ends, these means consisting in this embodiment of four rotating laminated sanding wheels 50 coated with silicon carbide abrasive. The wheels are carried on the spindles of double ended drive motors (not illustrated) which are energised during both the entry and exit strokes of the beam 28 to provide a two pass cleaning system.

As illustrated in FIG. 1f, (which could be interpolated between FIGS. 1a and 1b to give the complete sequence for this modification) the action of the sanding wheels through the welder die gap is to remove unwanted surface coatings from the strips across their full width and over an area corresponding to the area of the clamping dies of the welder.

The number and position of the sanding wheels depends upon the particular design of the welding machine, and in particular upon the way in which welding current is supplied through the clamps. In particular, four sanding wheels may be unnecessary as only the upper or lower surfaces of the strip ends may require cleaning. The mounting of the sanding wheels, in all cases, should provide for their adjustment to compensate for wear causing a reduction in the effective diameter of these units.

In a modification, instead of laminated sanding wheels, solid or flexible grinding wheels or sanding discs or belts may be used.

In view of the possibility that in certain circumstances surface coatings highly resistant to abrasive materials may be encountered, shot or sand blasting nozzles may be fitted to the leading edge of the beam 28 to remove surface coatings by the action of high speed metallic or granular particles directed towards the strip surface.

We claim:
1. A strip line flash welder including:
clamps for securing the ends of elongated metal strips, said strips having a larger width dimension than thickness dimension
a shear unit for shearing the ends of said metal strips between the clamps, said shear unit including a beam mounted at one side of the welder, driving means for reciprocating the beam transversely across the strip flow path in the direction of the width of the strips and between the clamps, and shearing elements mounted to and adjacent one end of the beam for transverse movement of said shearing elements across said strip flow path in the direction of the width of the strips to shear the strips in the direction of their widths,
primary means for moving the clamps and thereby the strip ends into substantially abutting relationship in readiness for flash welding, and
means for supplying current to the strip ends for flash welding together the strip ends.
2. A welder as claimed in claim 1 in which main and auxiliary clamps are provided for clamping each strip end.
3. A welder as claimed in claim 2, including adjustment means for moving the auxiliary clamps relative to the main clamps along the strip flow path through the clamps to cause the strip ends to project beyond the main clamps.
4. A welder as claimed in claim 3, in which said adjustment means includes an hydraulic unit for each pair of auxiliary clamps, each hydraulic unit incorporating a variable stop device accurately controlling the relative movement between the auxiliary and main clamps in accordance with characteristics of the strips.
5. A welder as claimed in claim 4 in which said primary means is operable on the main and auxiliary clamps of one strip end and incorporates an adjustable stop device for accurately controlling the movement of the clamps in readiness for welding in accordance with characteristics of the strip.

6. A welder as claimed in claim 5, in which said primary means includes means operable after commencement of welding, to effect a second "upset" movement of the clamps, a second adjustable stop device being provided to control the second movement.

7. A welder as claimed in claim 3, including die scrapers mounted between the shearing elements and said end of the beam.

8. A welder as claimed in claim 3, in which the shearing unit is pivotally mounted at the side of the clamps such that it may be moved out of line of the gap between the clamps.

9. A welder as claimed in claim 4 in which said primary means includes means operable on the main and auxiliary clamps of one strip end and incorporates an adjustable stop device for accurately controlling the movement of the clamps in readiness for welding in accordance with characteristics of the strip, said primary means further including means operable after commencement of welding to effect a second "upset" movement of the clamps, a second adjustable stop device to control the second movement, and means synchronizing the operation of said variable and adjustable stop devices.

* * * * *